US011190857B2

(12) United States Patent
Boler et al.

(10) Patent No.: US 11,190,857 B2
(45) Date of Patent: Nov. 30, 2021

(54) SENSOR ARRAY MULTIPLEXER

(71) Applicant: Leidos, Inc., Reston, VA (US)

(72) Inventors: Mitchell Eric Boler, Moss Point, MS (US); Steven Michael Johnson, Long Beach, MS (US)

(73) Assignee: Leidos, Inc., Reston, VA (US)

( * ) Notice: Subject to any disclaimer, the term of this patent is extended or adjusted under 35 U.S.C. 154(b) by 205 days.

(21) Appl. No.: 16/573,496

(22) Filed: Sep. 17, 2019

(65) Prior Publication Data
US 2020/0092620 A1 Mar. 19, 2020

Related U.S. Application Data

(60) Provisional application No. 62/732,634, filed on Sep. 18, 2018.

(51) Int. Cl.
*H04N 9/04* (2006.01)
*G01V 1/18* (2006.01)
*H04Q 9/04* (2006.01)

(52) U.S. Cl.
CPC ............... *H04Q 9/04* (2013.01); *G01V 1/186* (2013.01); *H04Q 2209/30* (2013.01); *H04Q 2213/132* (2013.01)

(58) Field of Classification Search
CPC ............... H04Q 9/04; H04Q 2213/132; H04Q 2209/30; G01V 1/186
See application file for complete search history.

(56) References Cited

U.S. PATENT DOCUMENTS

| | | | |
|---|---|---|---|
| 5,786,919 A * | 7/1998 | Habboosh | G01S 7/003 370/271 |
| 5,960,191 A | 9/1999 | Sample et al. | 395/500.49 |
| 6,760,610 B2 | 7/2004 | Tschupp et al. | 600/345 |
| 6,980,483 B2 | 12/2005 | McDonald | 367/93 |
| 9,271,665 B2 | 3/2016 | Sarrafzadeh et al. | 73/721 |
| 2002/0051228 A1* | 5/2002 | Spears | H04N 1/486 358/445 |

FOREIGN PATENT DOCUMENTS

WF WO 2000/033983 6/2000 ............ B08B 15/02

OTHER PUBLICATIONS

Training JTAG Interface, Lauterback GmbH, Version Apr. 16, 2019.
IGLOO Low-Power Flash FPGAs data sheet v2.0, Actel, Nov. 2009.
(Continued)

*Primary Examiner* — Manuel A Rivera Vargas
(74) *Attorney, Agent, or Firm* — Dawn-Marie Bey; Bey & Cotropia PLLC

(57) ABSTRACT

A system for collecting data from multiple sensors at a central node is described. The system includes multiple pairs of sensor array multiplexers (SAMs) and sensors connected in series along the length of two cables each having a twisted wire pair. A first end of the length of the two cables is connected to the central node for receiving data from each of the multiple pairs. The multiple pairs include sensors of at least two different types, which may have different sampling rates. The first cable carries timing data between the multiple pairs and the central node and the second cable carries sensor data between the multiple pairs and the central node.

20 Claims, 18 Drawing Sheets

(56) References Cited

OTHER PUBLICATIONS

Data Sheet MTi 1-Series, 3D AHRS/VRU/IMU Module, XSens, Document MT0512P, Revision, C1, Sep. 7, 2016, 35 pp.
Geospace Technologies, "Geophones GS-11D" [online], Feb. 7, 2012 [retrieved on Sep. 19, 2017], 3 pp., Retrieved from the Internet: http://www.geospace.com/geophones-gs-11d/.
Meggitt, Meggitt Advanced Sensing Technologies, 4 pp.
Wilcoxon Sensing Technologies, "Low-Frequency Vector Sensor VS-301," 2 pp., Aug. 2017.
Wilcoxon Sensing Technologies, "Mid-Frequency Vector Sensor VS-209," 2 pp., Aug. 2017.
Wilcoxon Sensing Technologies, "Low-Frequency Vector Sensor VS-101," 2 pp., Aug. 2017.
International Search Report and Written Opinion for App. No. PCT/US2019/051513, 12 pp., dated Jan. 16, 2020.

\* cited by examiner

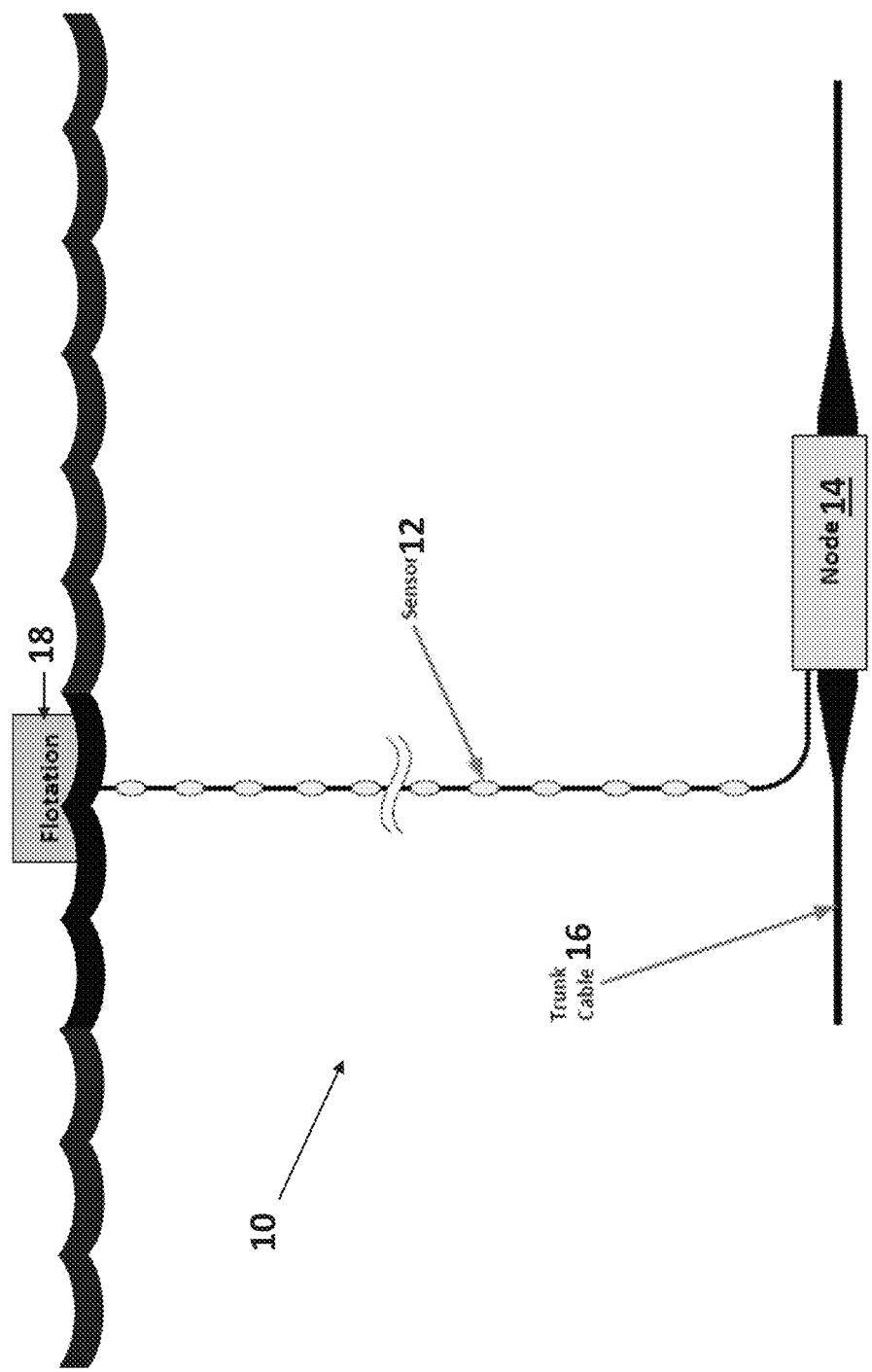

SENSOR ARRAY MULTIPLEXER

CROSS REFERENCE TO RELATED APPLICATIONS

The present application claims the benefit of priority to U.S. Provisional Patent Application No. 62/732,634 titled Sensor Array Multiplexer filed on Sep. 18, 2018, which is incorporated herein by reference.

BACKGROUND

Field of the Embodiments

The embodiments generally relate to a system and method for coordinating data intake from multiple sensors of disparate type and sample rates over a standard four wire cable.

Description of the Related Art

Other means of achieving the goal of coordinating intake of data from multiple sensors, e.g., Power-Over Ethernet, are geared towards higher data rates and consequently these implementations require more power. Additionally, unlike the present embodiments, existing systems do not provide signals which allow for simple derivation of synchronous timing at each sensor. One exemplary scenario wherein sensor coordination is required is in underwater applications for acoustic intelligence and surveillance applications to support anti-submarine warfare and to protect facilities on or near ports and waterways from sea-based access by intruders. But regardless of the intended application, a critical component to the optimal operation of an array of sensors is in the coordination of data collection from the individual sensors in the array to a central connection point, e.g., node, for eventual backend processing. For many applications, power and expense are key considerations in the development and operation of the array, the ultimate goal being to minimize both without sacrificing sensor array operability.

SUMMARY OF EMBODIMENTS

In a first embodiment, a system for collecting data from multiple sensors at a central node, includes: multiple pairs of sensor array multiplexers and sensors connected in series along the length of two cables each having a twisted wire pair; and a central node located at a first end of the length of the two cables for receiving data from each of the multiple pairs, wherein the multiple pairs include sensors of at least two different types and at least two different sampling rates.

In a second embodiment, a system for collecting data from multiple sensors at a central node, includes an M×N array of multiple pairs of sensor array multiplexers and sensors, wherein each row M includes a set of dual cables connecting the multiple SAM and sensor pairs to each other in the row M in series and to the central node and further wherein, each of the dual cables includes a twisted wire pair. The central node is located at a first end of the length of each set of dual cables for receiving data from each of the multiple pairs of sensor array multiplexers and sensors in each row M, wherein the sensors within each of the pairs of sensor array multiplexers and sensors are selected from at least two different sensor types.

In a third embodiment, a system for collecting data from multiple sensors at a central node, includes: multiple pairs of sensor array multiplexers and sensors connected in series along the length of two cables each having a twisted wire pair; and a central node located at a first end of the length of the two cables for receiving data from each of the multiple pairs, wherein at least one of the multiple pairs includes a sensor which provides at least one analog data signal and at least one digital data signal.

BRIEF SUMMARY OF FIGURES

The following figures are intended to be considered along with the Detailed Description set forth below:

FIG. 1 illustrates an exemplary simplified schematic of a sensor array system which may implement the embodiments described herein;

LISTING OF ACRONYMS

Figure 2A:
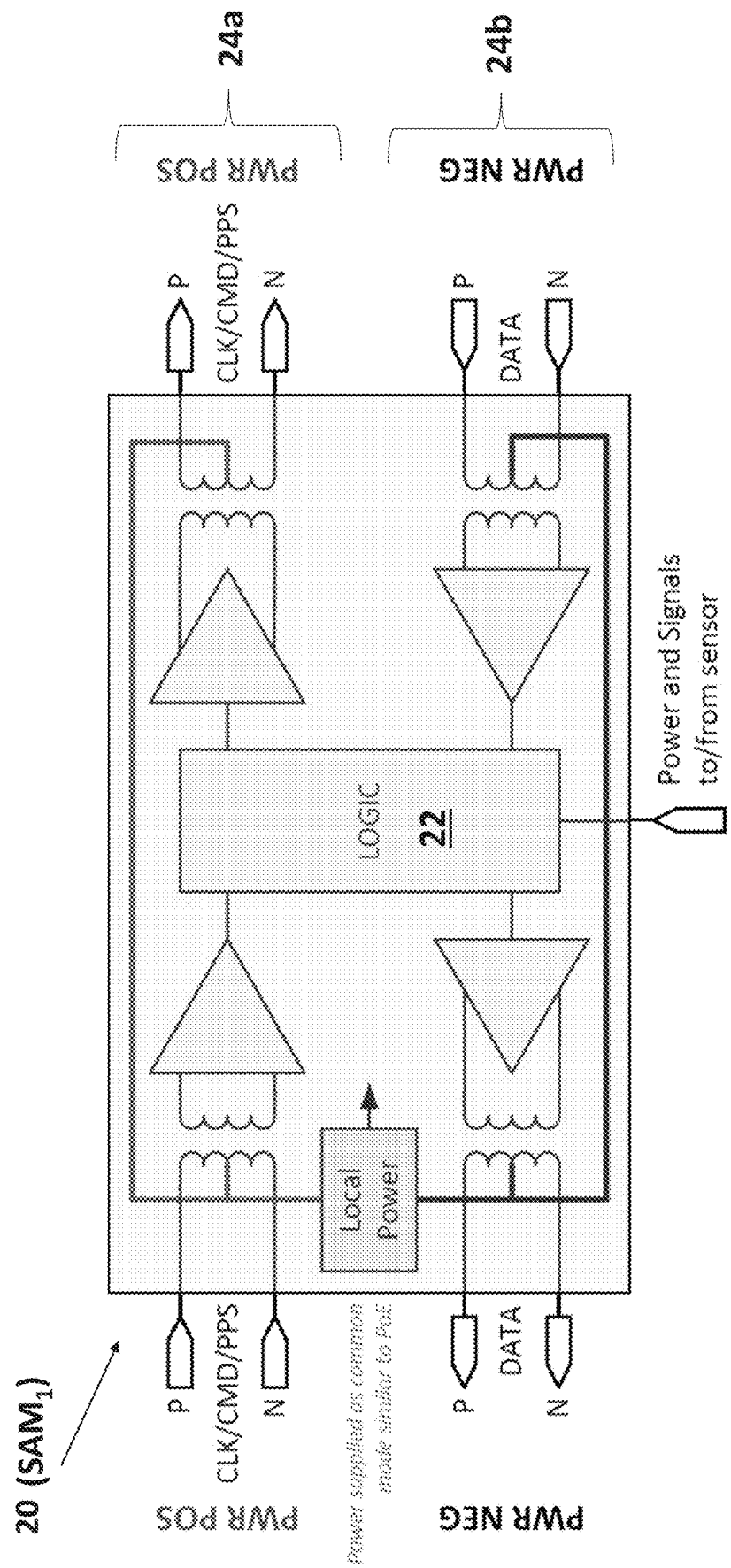
FIGS. 2a to 2g illustrate an exemplary sensor array multiplexer ("SAM") telemetry node in accordance with one or more embodiments herein including components and related circuitry schematics for implementing the following functionality: Low-voltage differential signaling ("LVDS") (FIG. 2c), power requirements (FIG. 2d), programmable interface control ("PIC") (FIG. 2e, FIG. 2f), external sensor data retrieval (FIG. 2g) and monitoring (FIG. 2h)

The following acronyms or abbreviations may be used in the Detailed Description and/or the Figures:

| Acronym -or- Abbreviation | Full Name/Description |
|---|---|
| ADC | Analog to Digital Converter |
| AINN | Analog input negative |
| AINP | Analog input positive |
| AN | Analog |
| AVS | Acoustic Vector Sensor |
| C | Capacitor |
| CAL | Calibrate |
| CLK | Clock |
| CMD | Command |
| CS | Chip select |
| D | Digital |
| DBG | Debug |
| DIN | Digital In |
| DOUT | Digital Out |
| EN/UVLO | Output enable/undervoltage lockout |
| FPGA | Field Programmable Gate Array |
| FTCK | FPGA Test Clock |
| FTDI | FPGA Test Data Input |
| FTDO | FPGA Test Data Output |
| FTMS | FPGA Test Mode Select |
| FTRST | FPGA Test Reset |
| GND | Ground |
| GNDQ | Ground (quiet) |
| HYD | Hydrophone |
| I2C | Integrated circuit protocol |
| IO | Input/Output |
| IB | Interface Block |
| JTAG | Industry standard for verifying designs and testing printed circuit boards after manufacture |
| LAVS | Leidos Acoustic Vector Sensor |
| LVDS | Low-voltage differential signaling |
| M | Monitor |
| MCLK | Master Clock |

| Acronym -or- Abbreviation | Full Name/Description |
|---|---|
| MCU | Microcontroller Unit |
| MH | Mounting Hole |
| MISO | Master in, Slave out |
| MOSI | Master out, Slave in |
| N | Negative |
| NEG | Negative |
| P | Positive |
| PGOOD | Power good pin/signal |
| PIC | Programmable Interface Controller |
| POS | Positive |
| PPS | Pulse-per-second |
| PROG | Program |
| PWR | Power |
| R | Resistor |
| RDYB | Ready/Set |
| RST | Reset Pin 1 |
| RSTB | Resent Pin 2 |
| RX | Receive |
| SAM | Sensor Array Multiplexer |
| SCK | Clock line for SDI |
| SCL | Clock line for I2C |
| SDA | Data line for I2C |
| SDI | Standard Data input |
| SDO | Standard Data output |
| SPI | Serial Peripheral Interface |
| SYNC | Synchronize |
| TEMP | Temperature |
| TCK | JTAG Clock |
| TDI | JTAG Test data input |
| TDO | JTAG Test data output |
| TMS | JTAG Test mode select |
| TRST | JTAG test reset |
| TX | Transmit |
| UART | Universal Asynchronous Receiver/Transmitter |
| UDP | User Datagram Protocol |
| V | Volts |
| VCC | FPGA Core supply voltage |
| VCCI | I/O Supply voltage |
| VCCPLF | Voltage to analog PLL |
| VCOMPLF | Ground to analog PLL power supplies |
| VDD | Voltage drain drain |
| VJTAG | JTAG supply voltage |
| VPUMP | Programming supply voltage |
| VSS | Voltage source source |
| XSENS | A COTS GNSS/INS (Global Navigation Satellite System/Inertial Navigation System) with GNSS receiver support, 3D Attitude and Heading Reference System (AHRS), Vertical Reference Unit (VRU) and Inertial Measurement Unit (IMU) |

DETAILED DESCRIPTION

The present embodiments are directed to a system and method for the use and operation of multiple sensors of disparate types and sample rates distributed along the length of a four wire cable, i.e., two twisted pairs. Power, timing and control signals are bussed to the sensors over the cable and, simultaneously, data from all of the sensors is transmitted back along the same cable. This mode of operation minimizes the required conductors, provides for the synchronous sampling of data, and intermixing of synchronous and asynchronous data obtained from the sensors. A combination of HDL-coded logic and circuit design provides the features which allow this telemetry arrangement to operate. Additionally, the sensor data is packaged into packets in accordance with a unique packet format which are similar to Ethernet but have considerably less overhead in terms of header information. This allows better utilization of bandwidth on a bandwidth-constrained cable.

The sensor array multiplexer (SAM) of the present embodiments as implemented uses less power than other solutions in part by operating at a line rate of less than 3 megabits per second. System timing is also an integral part of the design in contrast to other approaches. The present embodiments provide a master timing signal which includes both a system clock and a pulse-per-second (PPS) marker which allows all sensors to be simply and precisely simultaneously sampled. The packet (or message) format used is between ATM and Ethernet packet sizes and combines aspects of both (ATM virtual channels and payload type; Ethernet variable payload type) resulting in a format more suited for array telemetry.

By way of example only, FIG. 1 illustrates an exemplary simplified schematic of a sensor array system 10 which may implement the embodiments described herein with respect to the SAM. The sensor array system 10 includes multiple sensors 12, a central node 14 and transmission cabling 16. Additionally, FIG. 1 also shows a representative flotation device 18. For the sensors, the embodiments herein specifically reference hydrophones (omni and multidirectional), acoustic vector sensors (AVS) (for example, the AVS described in commonly owned U.S. patent application Ser. No. 15/714,130 filed Sep. 25, 2017 which is incorporated herein by reference), and engineering sensors in various examples, but the embodiments are not so limited as would be understood by one skilled in the art. Individual sensors or sensor components may include inertial measurement units (IMU), accelerometers, gyroscopes, magnetometers, compass, global navigation satellite system, vertical reference units, thermometer. Sensors provide data such as tilt, heading, location, temperature, force, angular rate, velocity, acceleration, deceleration, orientation, pitch, roll, yaw and the like. A single sensor may consist of multiple signals and the signals may be analog or digital.

Figure 2B:
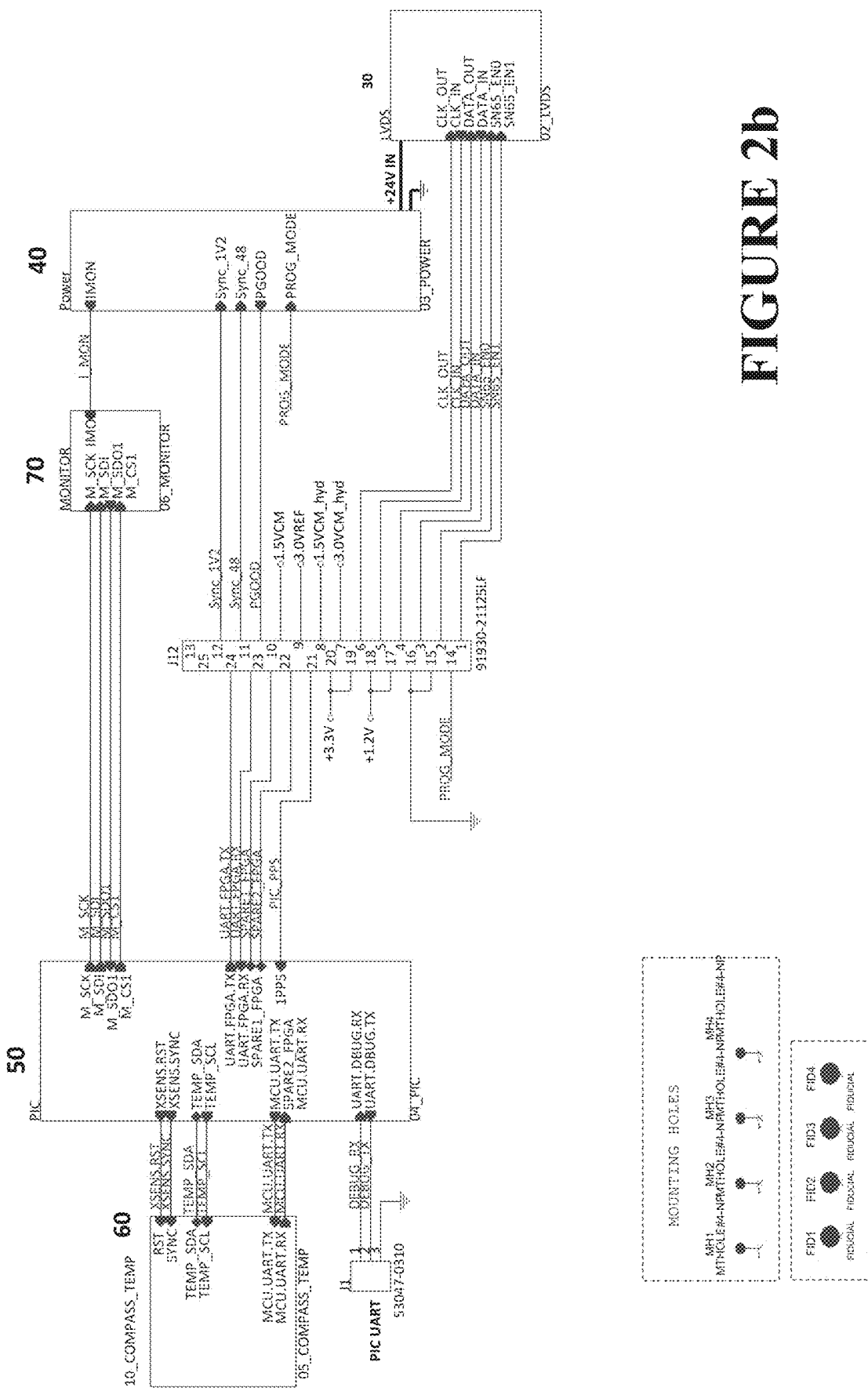
Figure 2C:
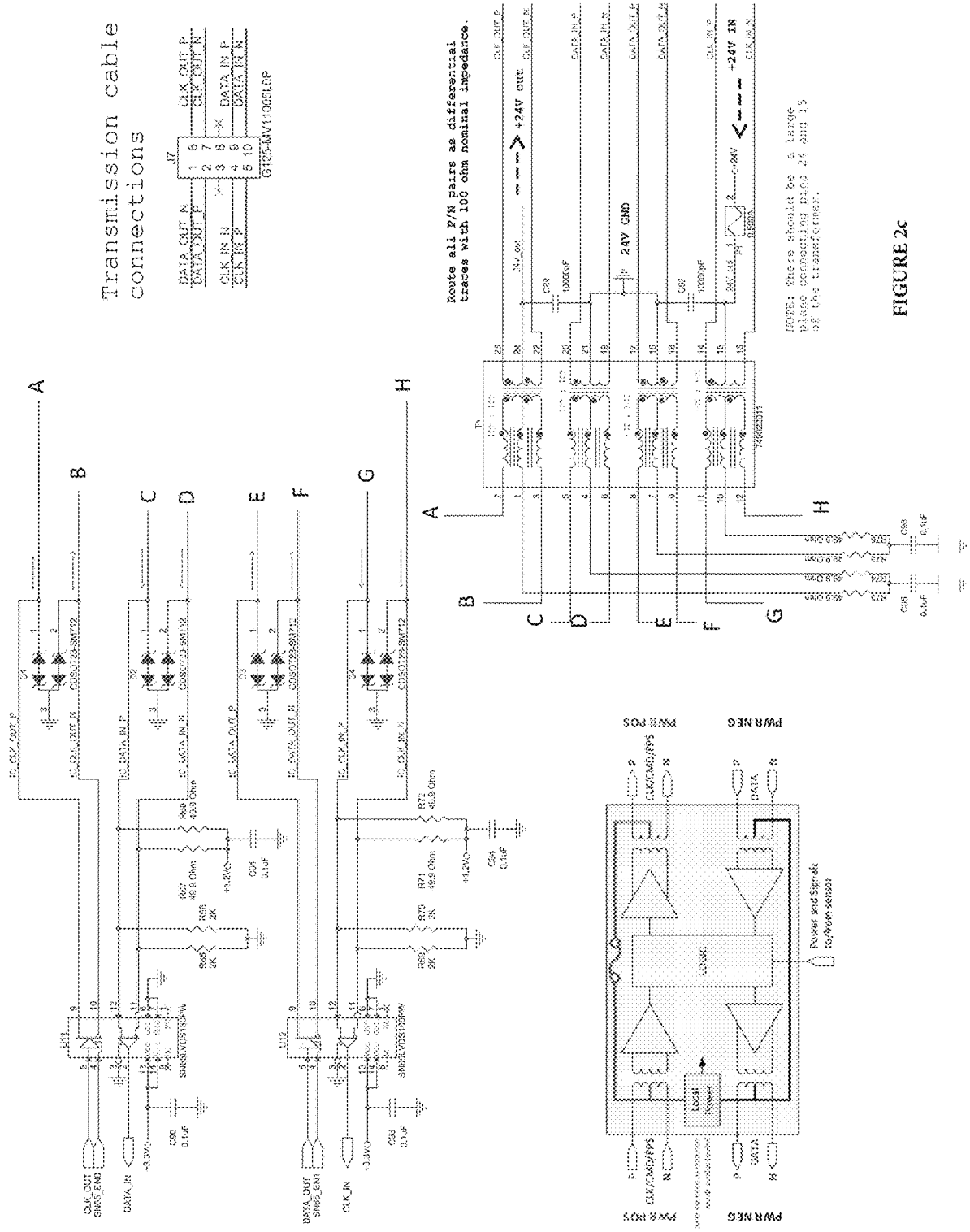
Figure 2D:
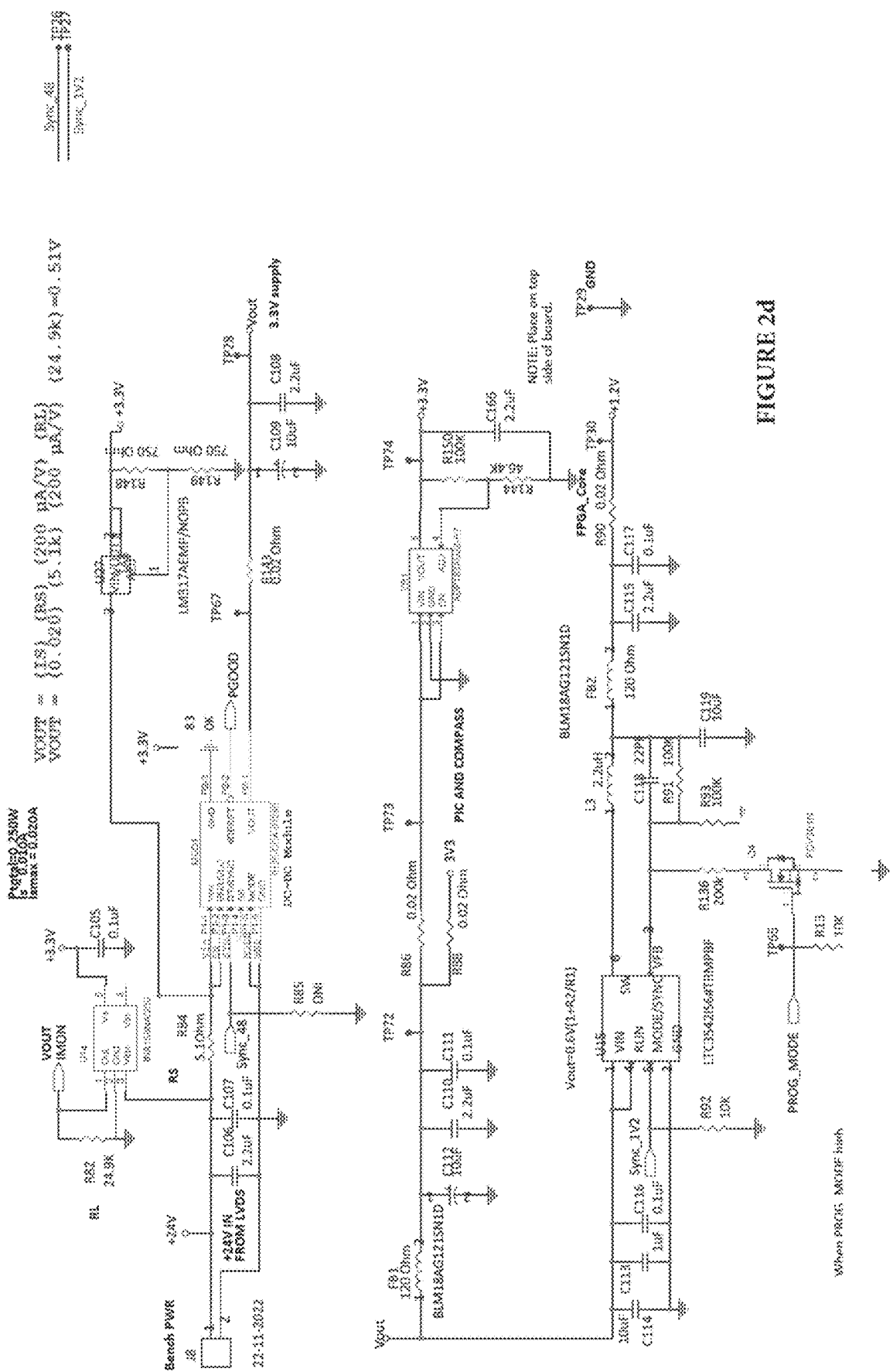
Figure 2E:
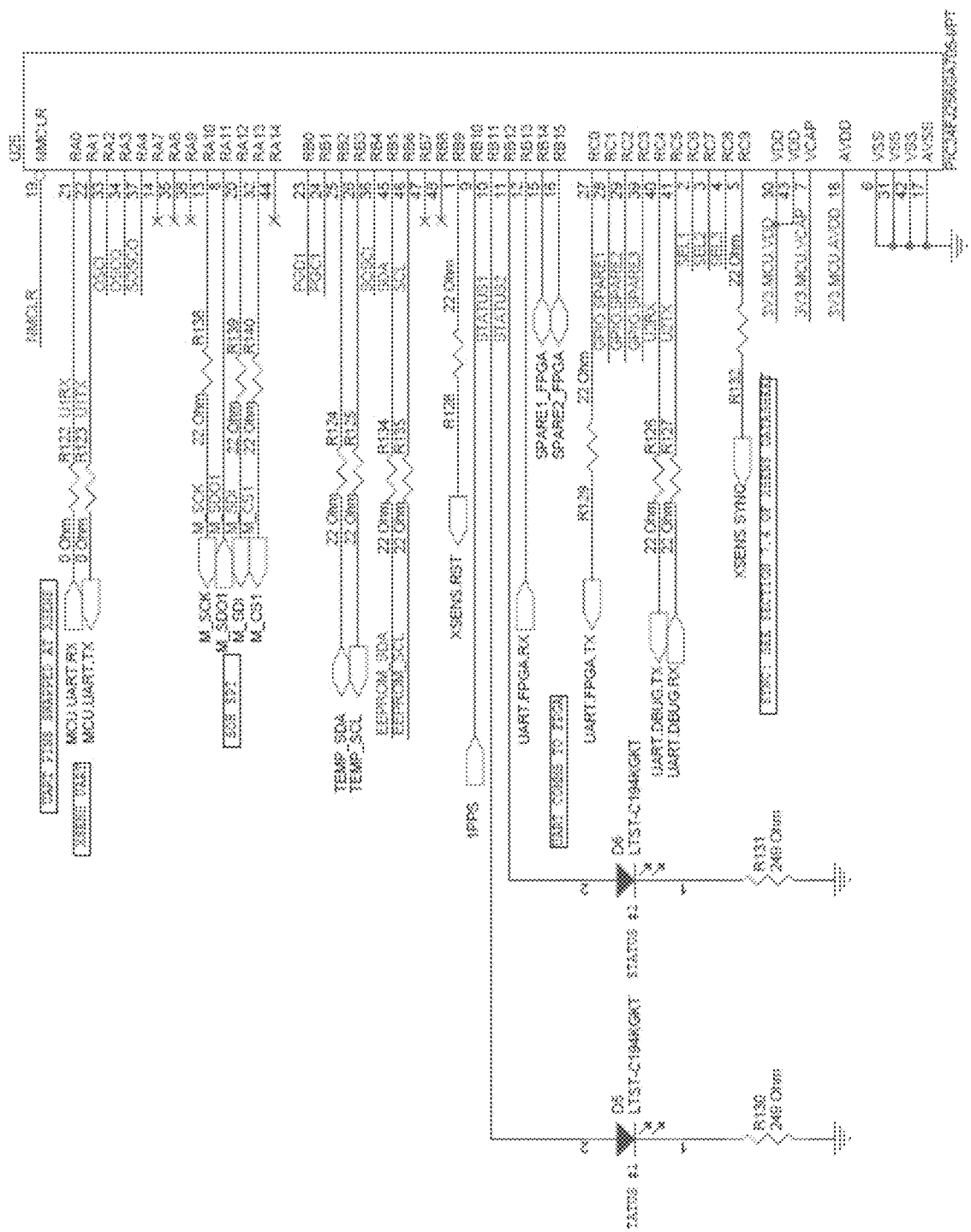
Figure 2F:
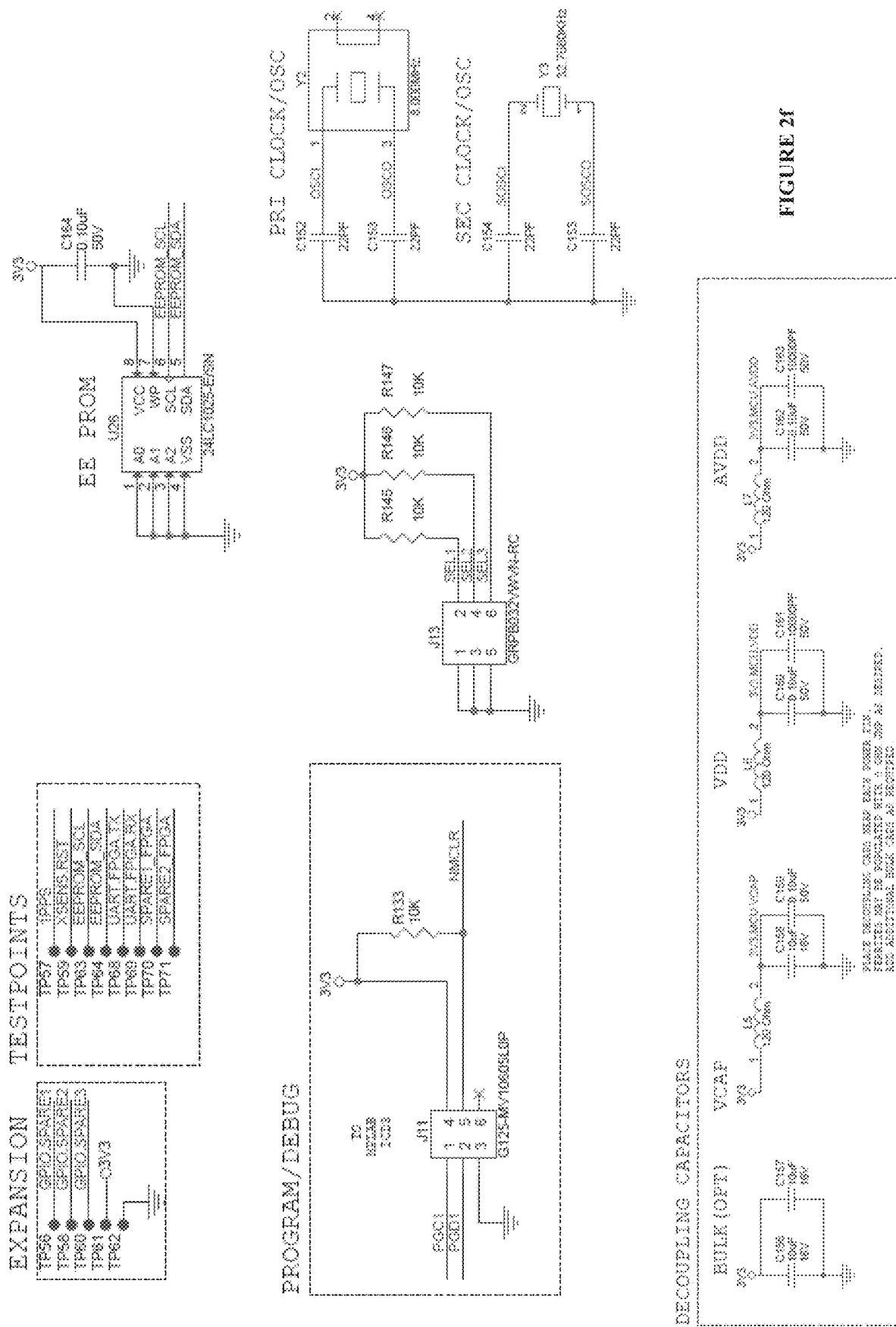
Figure 2G:
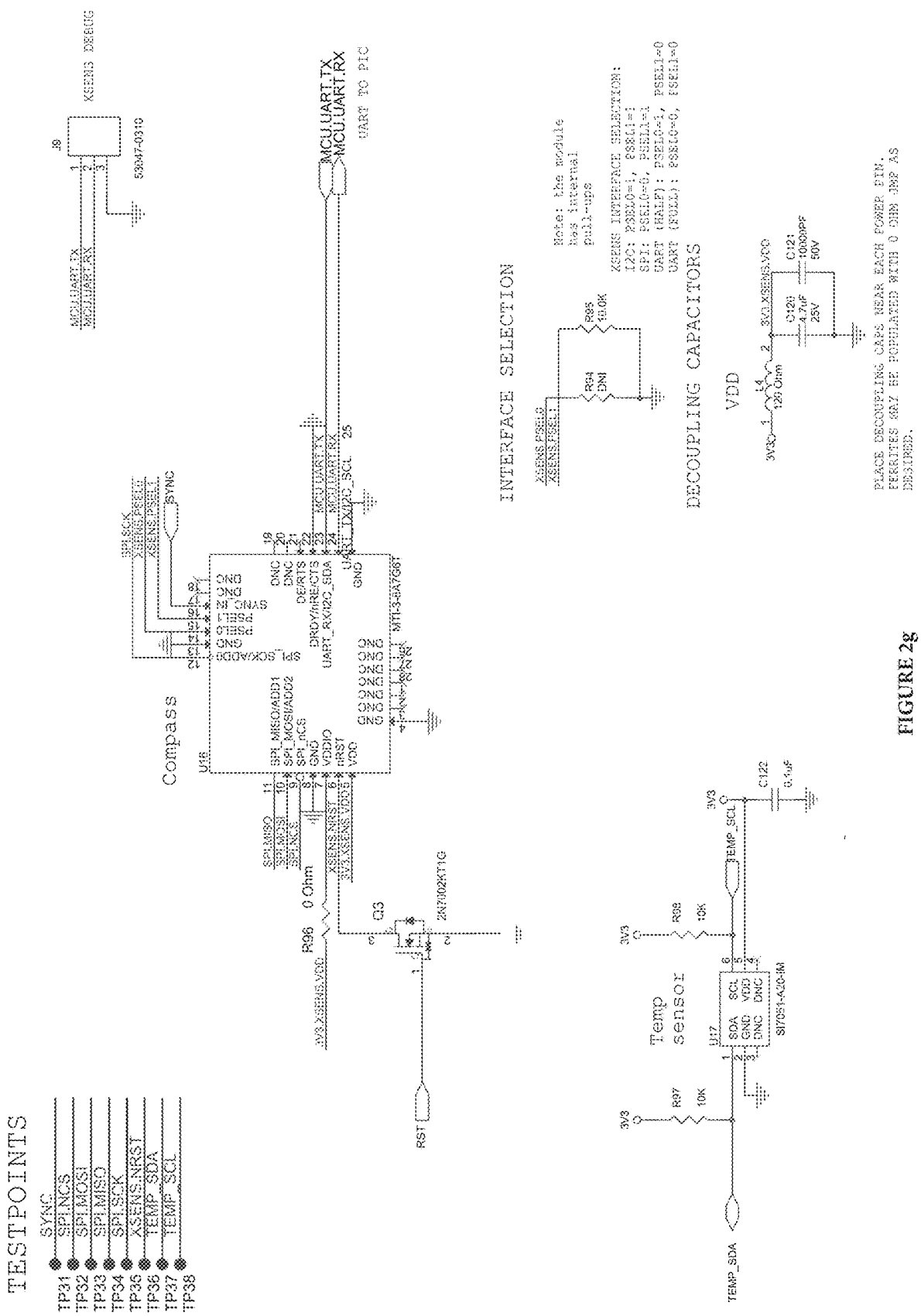
Figure 2H:
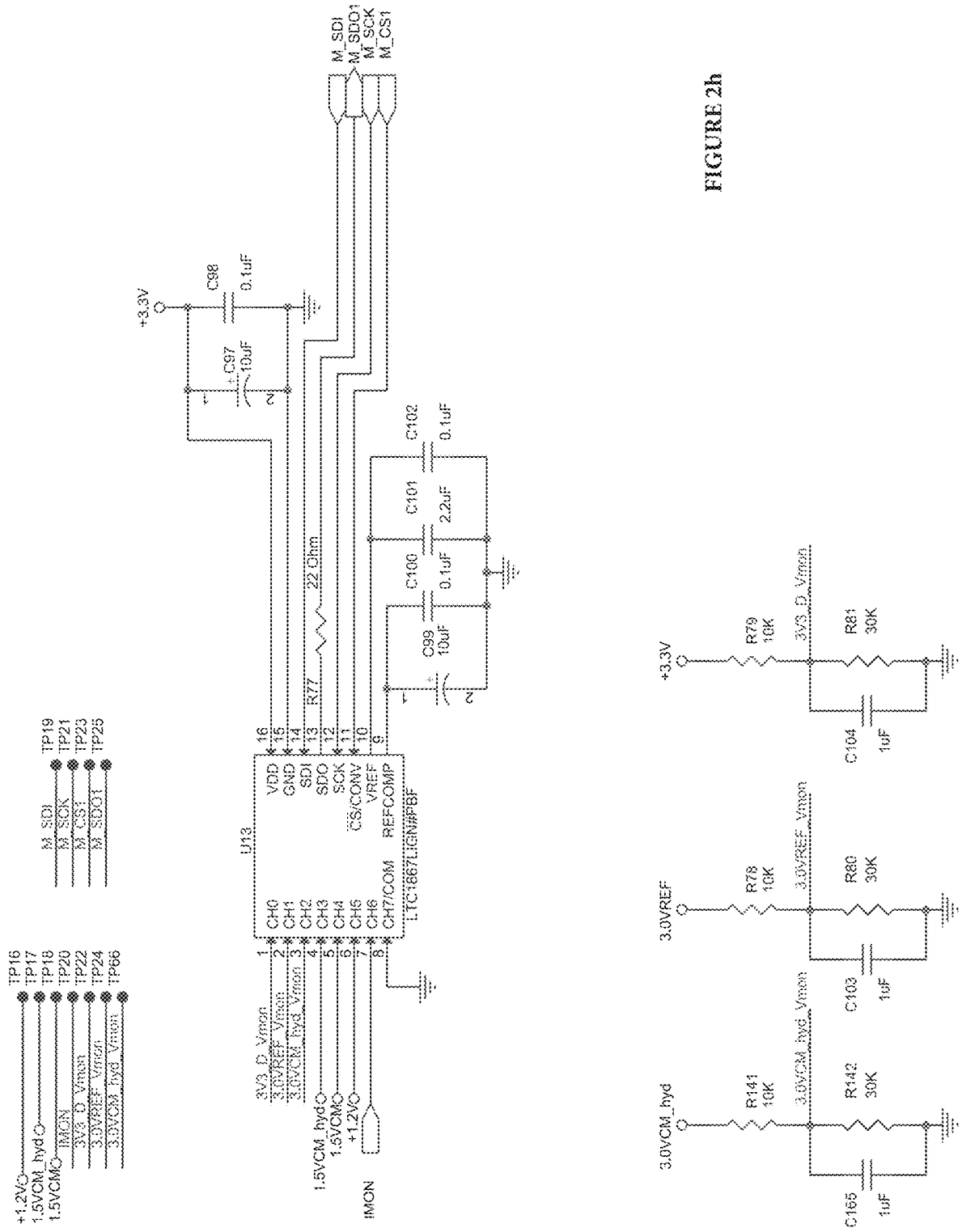

With respect to FIG. 2a, an exemplary SAM telemetry node 20 is shown. Each node includes logic 22, a first cable 24a with a first twisted pair of wires for carrying CLK, CMD and PPS signals in and out of each individual SAM node 20 and second cable 24b with a second pair of twisted wires for carrying data in and out of each individual SAM node 20, as well as numerous other components and related circuitry for facilitating the transport of power, clock, commands and PPS to its associated sensor. By way of example, FIG. 2b provides a top-level schematic of the various components and related interfaces and signals included in a SAM telemetry node 20 in accordance with one or more embodiments herein. As illustrated, this exemplary SAM telemetry node 20 includes LVDS 30 (FIG. 2c), Power 40 (FIG. 2d), PIC 50 (FIG. 2e and FIG. 2f, external sensor(s) 60 (FIG. 2g) and monitor 70 (FIG. 2h). Preferred electrical characteristics of the SAM telemetry node include: galvanical isolation to minimum of 1 kVrms for both input and output; LVDS signal levels; operational with unshielded twisted pairs over a length of at least 200 meters; and a bit error rate of less than $1 \times 10^{-9}$.

An exemplary external sensor referenced as XSENS in FIGS. 2e, 2f, 2g and 2h is a GNSS/INS (Global Navigation Satellite System/Inertial Navigation System) with GNSS receiver support, 3D Attitude and Heading Reference System (AHRS), Vertical Reference Unit (VRU) and Inertial Measurement Unit (IMU). A description of the characteristics and functionalities of the XSENS may be found in the MTi 1-series Data Sheet, Document MT0512P, Revision Cl, 7 Sep. 2016, the contents of which is incorporated herein by reference. As discussed herein above, this is but one example of a sensor which may be used in combination with the SAM per the embodiments.

Figure 3A:
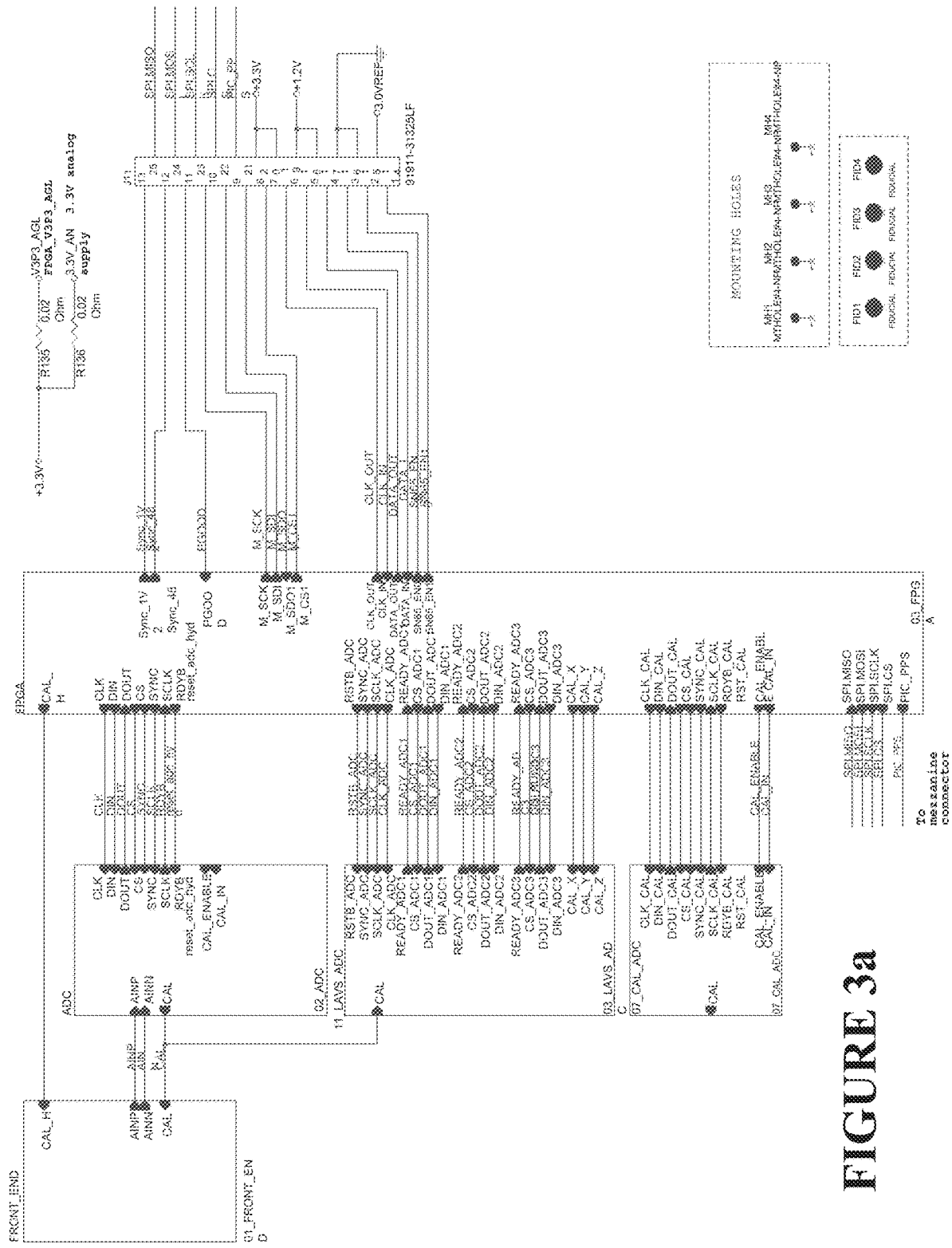
FIGS. 3a to 3g illustrate exemplary FPGA logic pin connections within each SAM telemetry node in accordance with one or more embodiments herein.
Figure 3B:
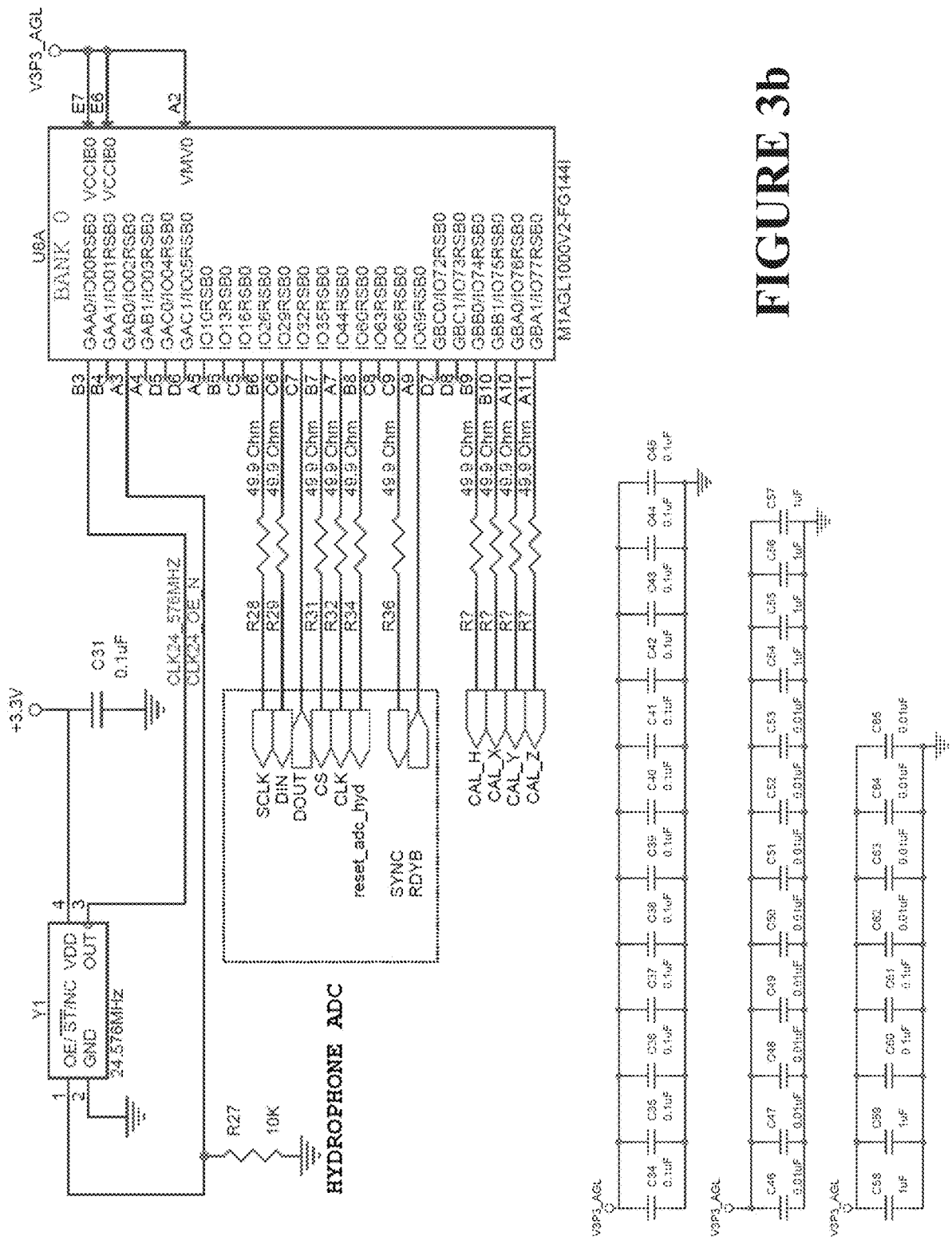
Figure 3C:
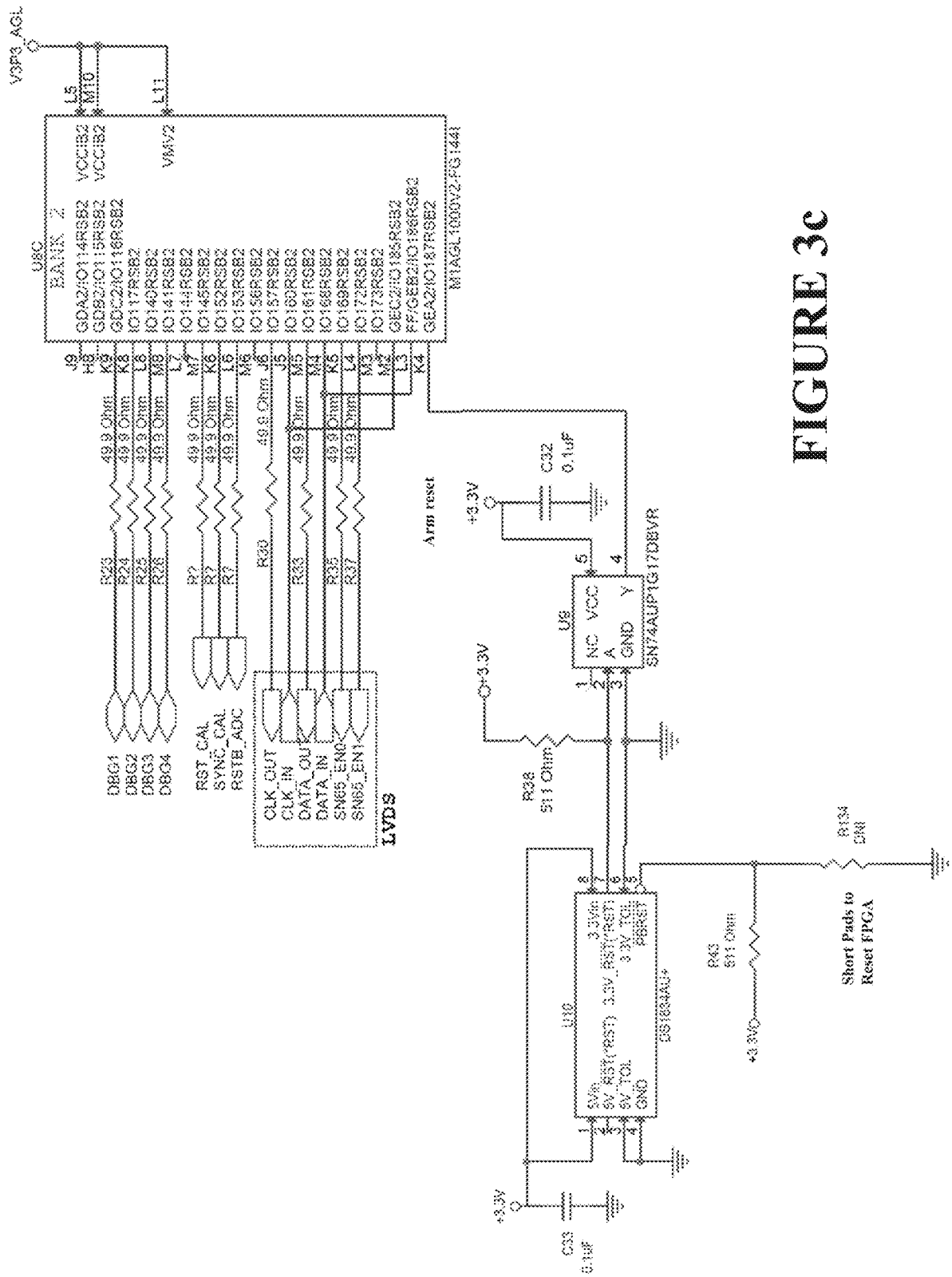
Figure 3D:
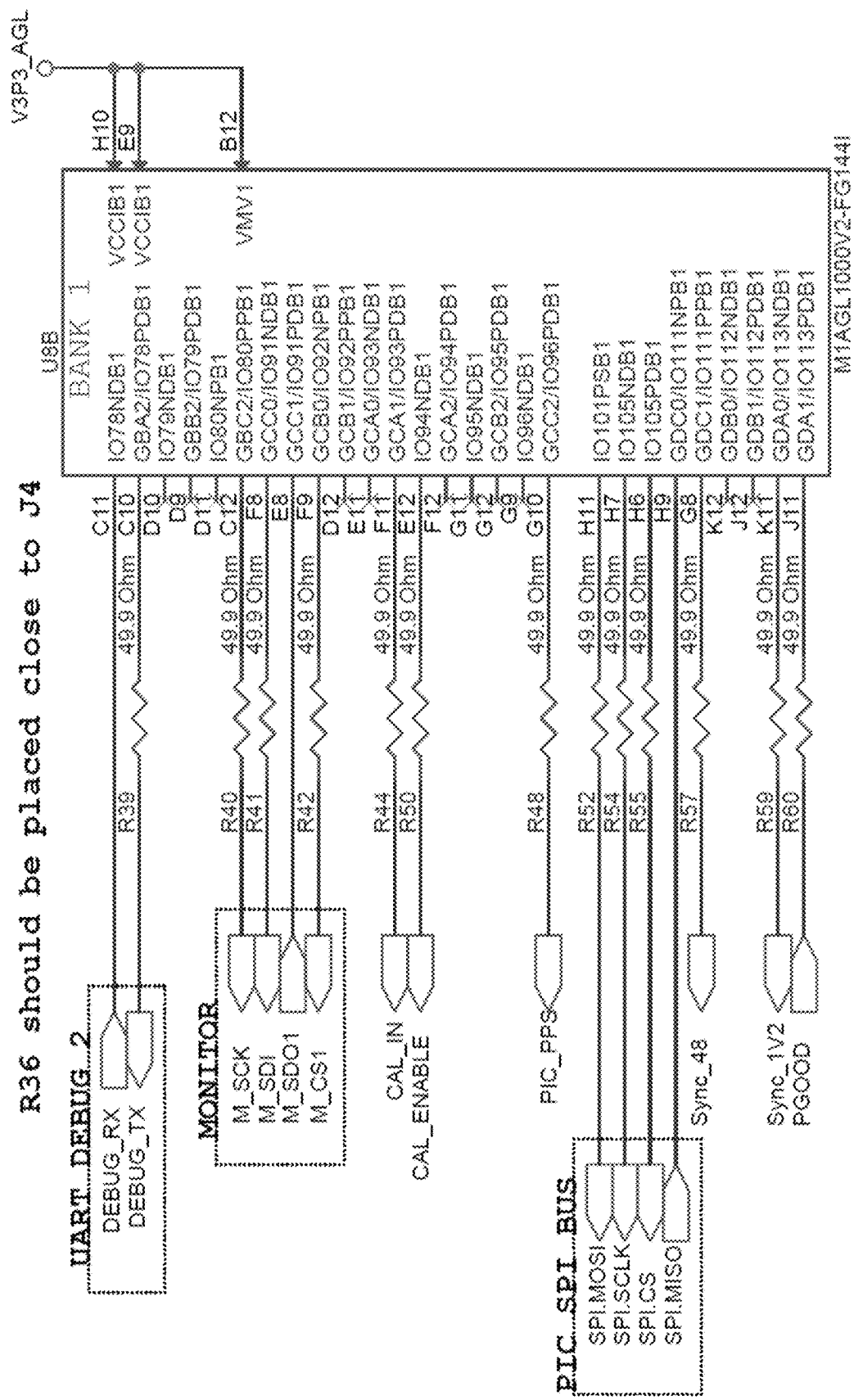
Figure 3E:
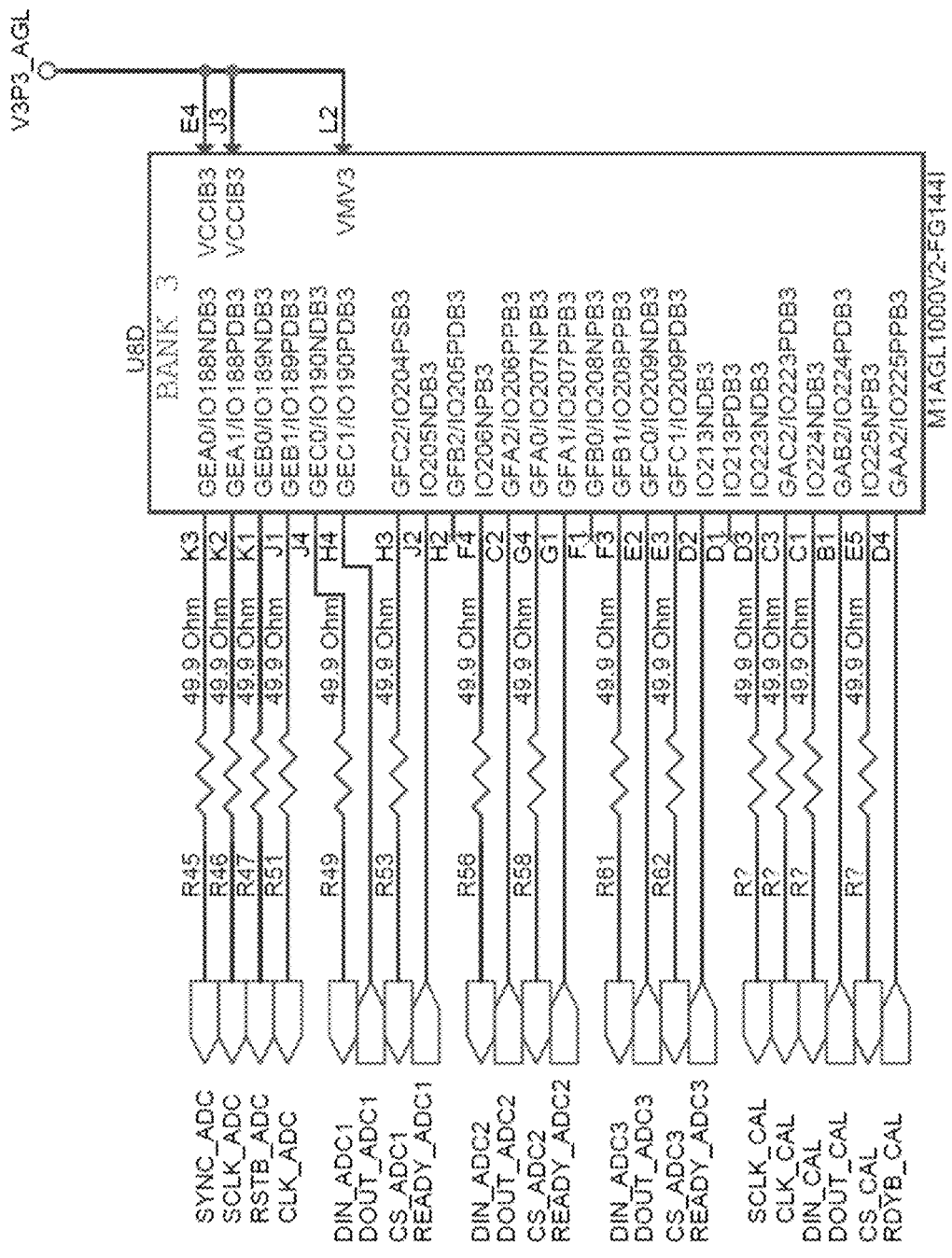
Figure 3F:
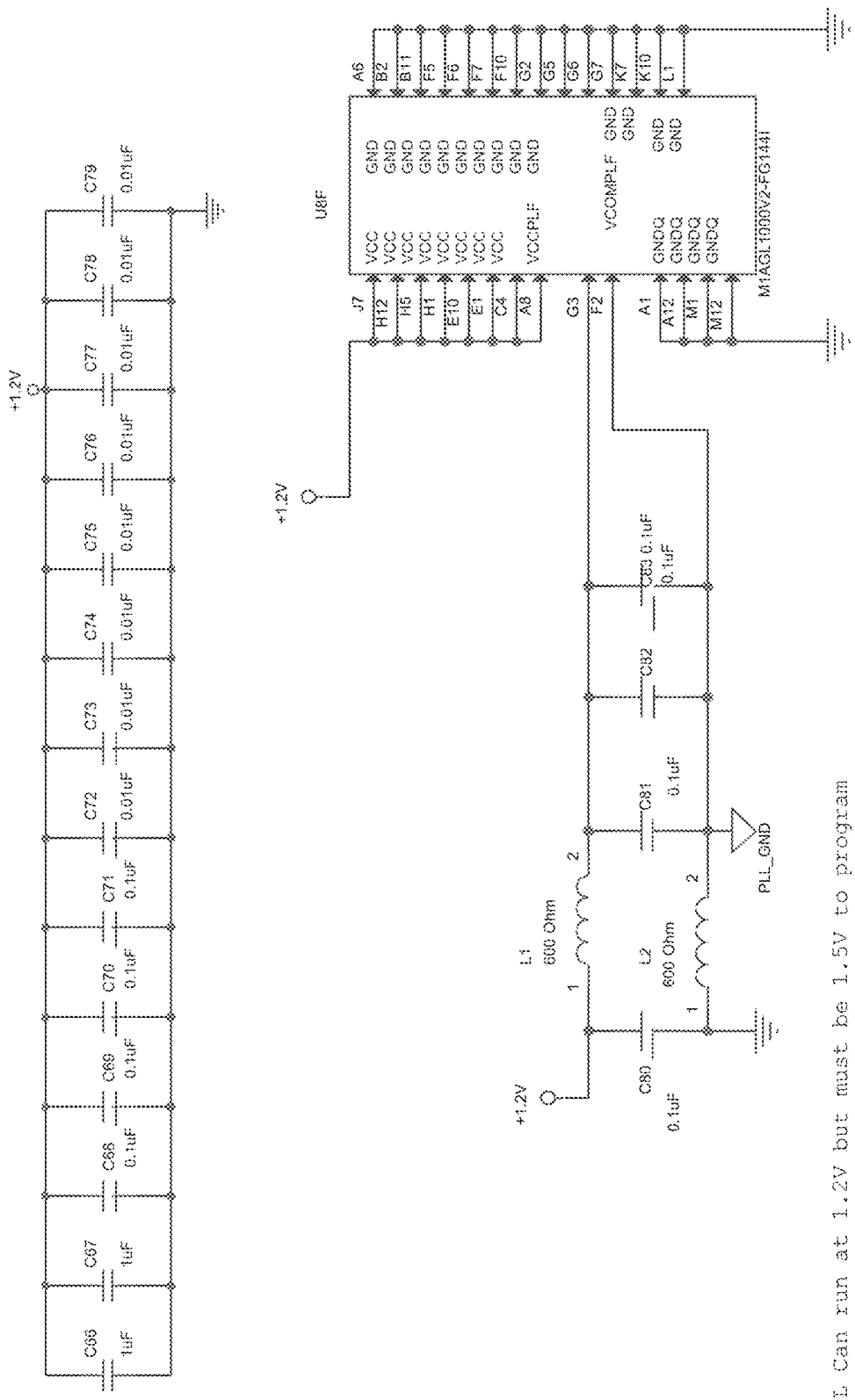
Figure 3G:
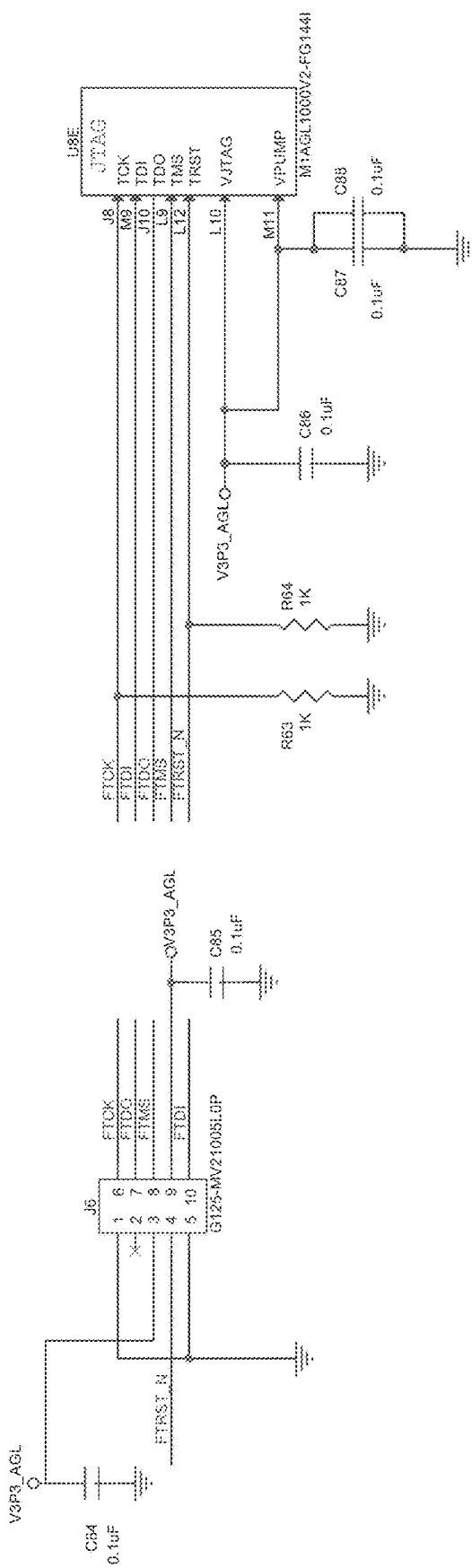

FIGS. 3a through 3g provide top level (FIG. 3a) and related views for exemplary FPGA logic 22 pin connections within each SAM telemetry node 20. In FIGS. 3b to 3e, the four I/O banks of an exemplary four bank FPGA are utilized for a first sensor ADC, e.g., hydrophone (FIG. 3b); the LVDS (FIG. 3c); UART debug, Monitor and PIC SPI BUS (FIG. 3d) and the LAVS and Temperature A/D (FIG. 3e). FIG. 3f illustrates power connections to the FPGA 22. FIG. 3g illustrates JTAG configuration for testing and debugging. Additional information regarding JTAG functionality, as well as details about an exemplary FPGA used in the illustrated schematics, can be found in one or both of the following references which are incorporated by reference and otherwise submitted to be within the skill of the art: Training JTAG Interface, Lauterback GmbH, Version 16 Apr. 2019 and the IGLOO Low-Power Flash FPGAs data sheet v2.0, Actel, Nov. 2009. The exemplary FPGA used in the present embodiments is a M1AGL1000V2-FG144I from Microsemi, but one skilled in the art will appreciate the myriad of other FPGA devices that may be used in accordance with various application requirements.

Figure 4:
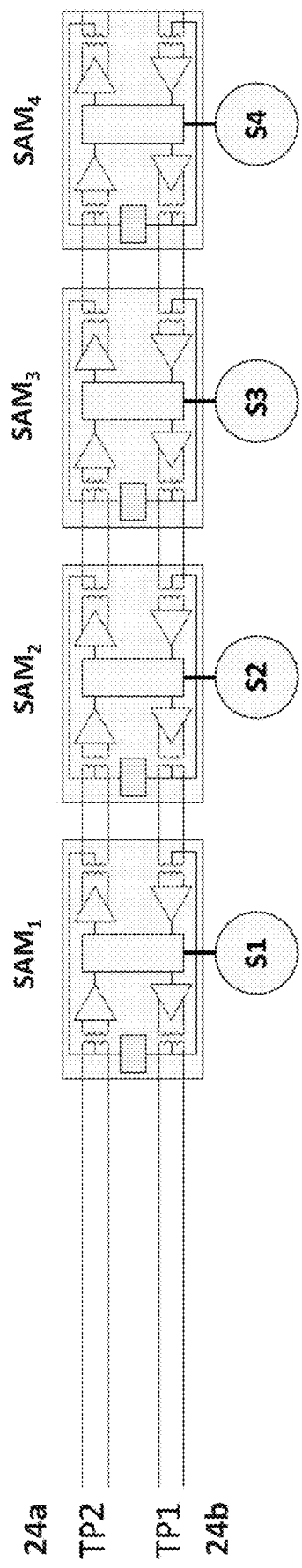
FIG. 4 illustrates a row of SAM/sensor pairs connected to two twisted wire cables in accordance with one or more embodiments herein.
Figure 5:
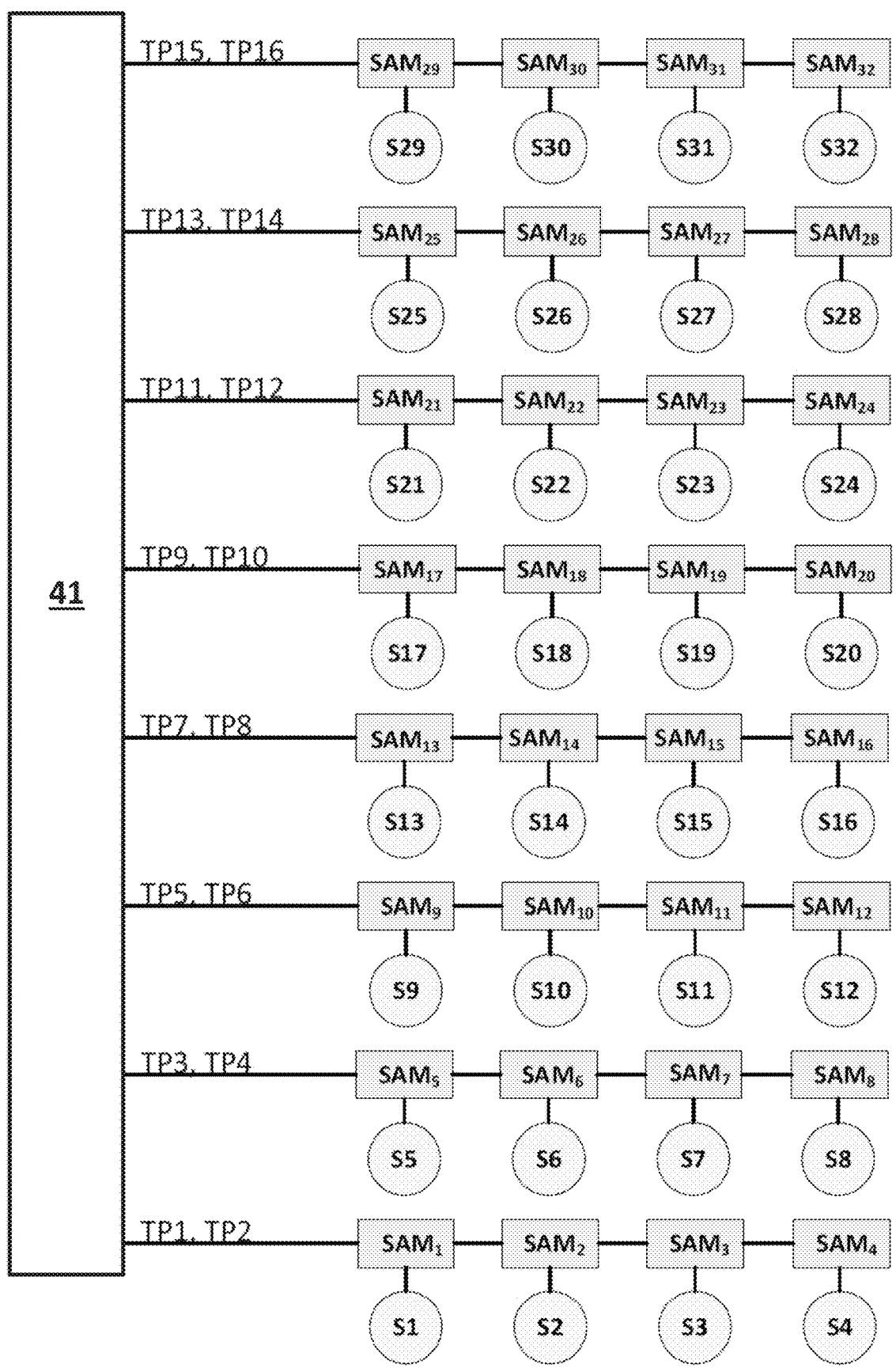
FIG. 5 illustrates an array of SAM/sensor pairs, including multiple rows, connected to a central node in accordance with one or more embodiments herein.

With respect to FIG. 4, an exemplary horizontal line array of multiple SAM and sensor pairs is shown. In this example, four SAM and sensor pairs ($SAM_1$, S1 ... $SAM_4$, S4) are shown and are interconnected by 2 twisted pair cables, TP1 (24a) and TP2 (24b). And in FIG. 5, an M×N array of SAM and sensor pairs ($SAM_1$, S1 ... $SAM_{32}$, S32) is illustrated, wherein each row M includes dual cables (4 wires) connecting the SAM and sensor pairs in its respective row to a central node 14. Each sensor S may have multiple signals to be transmitted via the SAM. For example, a vector sensor will have an X, Y, Z, and omni acoustic signal as well as some position signals. The current preferred embodiment includes architecture that supports 16 SAM/Sensor pairs in series. So, in FIG. 5, each row (M) could actually have 16 SAM/Sensor pairs instead of only four. Accordingly, for a given array of SAM/Sensor pairs, up to 256 virtual sensors (signals) may be distributed among the SAMs. So, in FIG. 5, cables TP1,TP2 could service 256 virtual sensors. For example, the vector sensor analog signals, e.g., X, Y, Z, and omni acoustic signal, could be treated as four virtual sensors. The SAMs connect multiple sensors of different types and sample rates to a central node 14 such as an underwater array like that of FIG. 1 does may be implemented in any system requiring sensor connection to a central node.

Each SAM supports multiple signal outputs, e.g., outbound messages, to its respective sensor. The SAM provides timing signals which include: an indication of the reference pulse-per-second (PPS) signal and a master clock synchronous with the PPS and having a rising edge aligned with the PPS edge. The SAM provides a mechanism for transmitting commands to the sensors. And the SAM provides D.C. power meeting one of the following two options: a 48-Volt power rail capable of providing 9.6 Watts and a 24-Volt power rail capable of providing 9.6 Watts.

Each SAM is also capable of transporting sensor data from between 1 and 16 sensors and thus also receives input signals, e.g. inbound messages. The sensors may have 8, 16, 24, or 32-bit values. Each SAM supports an overall bit rate of 1.92 MITs/second with actual speed determined by the system parameters such as cable characteristics and sensor requirements.

The sensors (S) are the primary data sources. With respect to the particular examples described herein, the system supports up to $N_{HYD}$ samples per message frame for the hydrophone sensor data packet (fewer if the frame counter is reset before the frame buffer is filled). Similarly, for the acoustic vector sensor data packet, the system supports up to NAvs samples per message frame and for the engineering sensor data packet, the system supports up to NEs samples per message frame; less if the frame counter is resent before the frame buffer is filled. Finally, the central node may also be a message source. Such messages may include health and status information provided by sensors in the central node and system state information held in the central node.

In a preferred embodiment, message rates vary, wherein the hydrophone sensor sample rate is $S_{HYD}$ samples per second (SPS) and the acoustic vector sensor sample rate is $S_{AVS}$ wherein $S_{AVS} \leq S_{HYD}$. The engineering sensor sample rate and the central node sample rate are both 1 sps. In a preferred embodiment, a sequence number counter is reset upon receipt of an external command, which is from the SAM command set. Alternatively, reset of a sequence number counter could occur upon reaching a specified count. The following considerations may be taken into account in selecting reset process. First, a critical data processing requirement is that all elements have their sequence numbers synchronized over the long run, i.e., over a period longer than the loss of any single message or the failure to correctly execute any single reset. Second, all elements must have their sequence number simultaneously reset. SAM command messages are sent by the central node at the PPS clock boundary. Third, synchronization does not have to be with respect to the telemetry clock, or bit rate, but with respect to the hydrophone sampling rate; and the propagation delay of a reset command from the central node to the furthest element is inconsequential (at worst <<1% of a sample period). Fourth, the sequence numbers associated with the least frequent messages (1 sps) should increment to some number greater than one between resets so that the backend processor(s) can readily detect a dropped message.

Further to the preferred embodiment, message sequence number rules are as follows: (1) sequence numbers originate at the source of the data, e.g. at an element; (2) each source increments its sequence number upon the transmission of a hydrophone message; (3) each message type assigns its sequence number to be the value of the sequence number when the first data sample is inserted into the message payload; (4) upon receipt of the specified reset signal each message type will be concluded with the most recently acquired measurement and immediately transmitted; and (5) sequence numbers increment until reset by an external signal per earlier description (overriding (3) above).

The central node should be the source of the Message Sequence Counter Reset logic; sending reset commands to all of the SAM elements. Logic within the central node monitors the SAM message counter values to determine the correct time to generate a reset message. That is, the logic is able to accommodate the loss of messages from one or more elements and deduce the correct message count. A suggested value for the reset threshold is any number between 180 and 225 that is modulo (15). The suggestion is stated in this way to avoid any statement indicating a time interval.

The following tables provide message format specifications for messages created by the SAMs and/or central node.

TABLE 1

Payload, Element (via SAM) or Central Node

| Data Description | Bytes | Default Value | Examples |
|---|---|---|---|
| SYNC, frame synchronization | 2 | Binary - 1111110100101001 | 0xfd29 |

TABLE 1-continued

Payload, Element (via SAM) or Central Node

| Data Description | Bytes | Default Value | Examples |
|---|---|---|---|
| signal | | Hex - 0xfd29 | |
| SAM ID#, position of element within array, 1 - N from node to end | 1 | None | 0x00, node, Node ID 0x10, element #16, SAM ID |
| Payload Source - $35_{10}$ = HLA $36_{10}$ = VLA $37_{10}$ = Node | 1 | None | 0x24, VLA Source |
| Payload Type - Hydrophone = 1 Vector Sensor = 2 Engineering Sensor = 3 UART = 4 Node = 7 | 1 | None | 0x03, Engineering Sensor |
| Board Serial Number | 2 | Factory Programmable | 0x0005 |
| Payload Length, Message Sequence Number plus Data Sample Set | 2 | None | 0x017c, 2 bytes of sequence number + 378 bytes of data samples |
| Message Sequence Number, $0 \le N \le$ Reset Value | 2 | None | Decimal - 266 Hex - 0x010a |
| Data Sample Set, 1-400 samples | 2/ sample | None | A single sample: Binary - 1100011111010010 Decimal - −14382 Hex - 0xc7d2 |
| Payload CRC | 4 | CRC-32, includes all bytes above | 0xca3431 |

TABLE 2

Command Packet

| BYTES | ID | DESCRIPTION |
|---|---|---|
| 1 | Preamble | 0xFF the preamble is the default state of the line |
| 2 | Sync | 0xFD29 - marks the next clock as the PPS Location |
| 2 | Command Address | 65536 Sensor Addresses - ABCD |
| 64 | Command Data | Sensor Command Data |
| 4 | Packet CRC | CRC32 - The next bit is PPS location |

TABLE 3

Command Address

| ms byte | ls byte | ID |
|---|---|---|
| 0 | 0-255 | Hydrophone |
| 1 | 0-255 | Vector |
| 2 | 0-255 | Heading |
| 3 | 0-255 | Temperature |
| 4 | 0-255 | Tilt |
| 5-255 | 0-255 | Reserved |

TABLE 4

Central Node to Backend Processor(s)

| Message Description | Bytes |
|---|---|
| Ethernet Header | 22 |
| IP Header | 20 |
| UDP Header | 8 |
| Payload | ≤813 |
| Frame Check Sequence | 4 |

TABLE 5

Ethernet Header, created in Central Node

| Data Description | Bytes | Value |
|---|---|---|
| Preamble | 7 | All Bytes = Binary - 10101010 Hex - 0xaa |
| Start Frame Delimiter | 1 | Binary - 10101011 Hex - 0xab |
| MAC Destination Address | 6 | Single address of PTS and Backend Station |
| MAC Source Address | 6 | TA MAC address |
| Ethernet Payload Length, includes IP and UDP Headers | 2 | None |

TABLE 6

IP Header, created in Central Node

| Data Description | Bytes | Value |
|---|---|---|
| IP Version (4 bits)/Header Length (4 bits designating the number of 32 bit words) | 1 | 0x4/0x5 |
| Type of Service | 1 | 0x00 |
| IP Length | 2 | IP packet size, includes IP header, UDP header and payload |
| ID | 2 | 0x0000 |
| Flags (3 bits)/Fragment (13 bits) | 2 | 0x0000 |
| Time to Live | 1 | 0x64 (102 seconds) |
| Protocol | 1 | 0x11 |
| IP Header Checksum | 2 | None |
| IP Source Address | 4 | TA IP address |
| IP Destination Address | 4 | PTS and Backend Station IP address |

TABLE 7

UDP Header

| Data Description | Bytes | Value |
|---|---|---|
| Source Port | 2 | 0x0000 |
| Destination Port | 2 | 0x0000 |
| UDP Length | 2 | Length of UDP header |
| Checksum | 2 | Checksum of header and |

TABLE 8

Data Sample Set/Hydrophone Message (created in SAM)

| Data Description | Byte # |
|---|---|
| Sample 1, MSB | 1 |
| Sample 1, LSB | 2 |

TABLE 8-continued

Data Sample Set/Hydrophone Message (created in SAM)

| Data Description | Byte # |
|---|---|
| Sample 2, MSB | 3 |
| Sample 2, LSB | 4 |
| . | . |
| . | . |
| . | . |
| Sample N, MSB (1 ≤ N ≤ 200) | 2*N−1 |
| Sample N, LSB (Nnominal = 200) | 2*N |

TABLE 9

Data Sample Set/AVS Message (created in SAM)

| Data Description | Byte1 |
|---|---|
| Sample 1, X-axis, MSB | 1 |
| Sample 1, X-axis, LSB | 2 |
| Sample 1, Y-axis, MSB | 3 |
| Sample 1, Y-axis, LSB | 4 |
| Sample 1, Z-axis, MSB | 5 |
| Sample 1, Z-axis, LSB | 6 |
| Sample 2, X-axis, MSB | 7 |
| . | . |
| . | . |
| . | . |
| Sample M, Z-axis, MSB (1 ≤ M ≤ 100) | 6*M−1 |
| Sample M, Z-axis, LSB (Mnominal = 69) | 6*M |

TABLE 9

Data Sample Set/Engineering Sensor Message (created in SAM)

| Data Description | Byte1 |
|---|---|
| Sample 1, Heading, MSB | 1 |
| Sample 1, Heading, LSB | 2 |
| Sample 1, X-axis Tilt, MSB | 3 |
| Sample 1, X-axis Tilt, LSB | 4 |
| Sample 1, Y-axis Tilt, MSB | 5 |
| Sample 1, Y-axis Tilt, LSB | 5 |
| Sample 1, Temperature, LSB | 6 |
| Sample 1, Temperature, MSB | 7 |
| Sample 2, Heading, MSB | 8 |
| Sample 2, Heading, LSB | 9 |
| . | . |
| . | . |
| . | . |
| Sample K, Temperature, MSB (1 ≤ K ≤ 50) | 6*N−1 |
| Sample K, Temperature, LSB (Knominal = 13) | 6*N |

TABLE 10

Data Sample Set/Health & Status Message (created in Central Node)

| Data Description | Byte1 |
|---|---|
| Sample 1, Sensor 1, MSB | 1 |
| Sample 1, Sensor 1, LSB | 2 |
| Sample 1, Sensor 2, MSB | 3 |
| Sample 1, Sensor 2, LSB | 4 |
| Sample 1, Sensor 2, MSB | 5 |
| . | 6 |
| . | 7 |
| Sample 1, Sensor L, MSB | 2*L−1 |
| Sample 1, Sensor L, LSB | 2*L |
| . | . |
| . | . |
| . | . |
| Sample K, Sensor L, MSB (1 ≤ J ≤ 20) | L*J−1 |
| Sample K, Sensor L, LSB (Jnominal = 13) | L*J |

SAM/Sensor pair calibration is performed when commanded via existing multiplexing digital circuitry at the SAM/sensor pair. The Central Node transmits the calibration command as directed by the user to SAM/sensor pairs individually or as a group. Electronic circuitry within the SAM generates a calibration signal of known amplitude and frequency content and connects the signal to the sensor being calibrated. The resulting sensor output, when compared with the known input, allows the user to develop a model of the sensor response and thus prepare a calibration curve for the sensor response.

One skilled in the art recognizes that many of the particular components used in the examples described herein and depicted in the figures are merely exemplary. Alternative selections of COTS, GOTS and/or custom components based on specific intended application, power requirements, distance, and other environmental considerations are within the scope of the embodiments.

The invention claimed is:

1. A system for collecting data from multiple sensors at a central node, comprising:
   multiple pairs of sensor array multiplexers and sensors connected in series along the length of two cables each having a twisted wire pair; and
   a central node located at a first end of the length of the two cables for receiving data from each of the multiple pairs, wherein the multiple pairs include at least two different sensors and at least two different sampling rates.

2. The system of claim 1, wherein a first cable carries timing data between the multiple pairs and the central node and a second cable carries sensor data between the multiple pairs and the central node.

3. The system of claim 2, wherein the timing data includes clock, command and pulse-per-second signals.

4. The system of claim 1, wherein the sensors are selected from the group consisting of: a hydrophone, an acoustic vector sensor, and an engineering sensor.

5. The system of claim 1, wherein the sensors provide data selected from the group consisting of: tilt, heading, temperature, force, angular rate, velocity, acceleration, deceleration, orientation, pitch, roll, and yaw.

6. The system of claim 1, wherein the sensors provide data signals in analog and digital formats.

7. The system of claim 1, wherein each sensor array multiplexer includes a FPGA.

8. The system of claim 1, wherein the multiple pairs of sensor array multiplexers and sensors are located under water.

9. A system for collecting data from multiple sensors at a central node, comprising:
   an M×N array of multiple pairs of sensor array multiplexers and sensors, wherein each row M includes a set of dual cables connecting the multiple SAM and sensor pairs to each other in the row M in series and to the central node and further wherein, each of the dual cables includes a twisted wire pair; and the central node being located at a first end of the length of each set of dual cables for receiving data from each of the multiple pairs of sensor array multiplexers and sensors in each row M, wherein the sensors within each of the pairs of sensor array multiplexers and sensors are selected from at least two different sensors.

10. The system of claim 9, wherein a first cable in each set of dual cables carries timing data between the multiple pairs and the central node and a second cable in each set of dual cables carries sensor data between the multiple pairs and the central node.

11. The system of claim 10, wherein the timing data includes clock, command and pulse-per-second signals.

12. The system of claim 9, wherein the sensors are selected from the group consisting of: a hydrophone, an acoustic vector sensor, and an engineering sensor.

13. The system of claim 9, wherein the sensors provide data selected from the group consisting of: tilt, heading, temperature, force, angular rate, velocity, acceleration, deceleration, orientation, pitch, roll, and yaw.

14. The system of claim 9, wherein the sensors provide data signals in analog and digital formats.

15. The system of claim 9, wherein each sensor array multiplexer includes a FPGA.

16. The system of claim 9, wherein the M×N array of multiple pairs of sensor array multiplexers and sensors is located under water.

17. A system for collecting data from multiple sensors at a central node, comprising:

multiple pairs of sensor array multiplexers and sensors connected in series along the length of two cables each having a twisted wire pair; and a central node located at a first end of the length of the two cables for receiving data from each of the multiple pairs, wherein at least one of the multiple pairs includes a sensor which provides at least one analog data signal and at least one digital data signal.

18. The system of claim 17, including 16 sensor array multiplexers and sensors connected in series.

19. The system of claim 17, wherein a first cable carries timing data between the multiple pairs and the central node and a second cable carries sensor data between the multiple pairs and the central node.

20. The system of claim 19, wherein the timing data includes clock, command and pulse-per-second signals.

\* \* \* \* \*